(12) United States Patent
Hayashi et al.

(10) Patent No.: US 10,440,282 B2
(45) Date of Patent: Oct. 8, 2019

(54) IMAGING APPARATUS AND IMAGING METHOD

(71) Applicant: Olympus Corporation, Hachioji-shi, Tokyo (JP)

(72) Inventors: Toshikazu Hayashi, Sagamihara (JP); Taichiro Kouchi, Hino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 243 days.

(21) Appl. No.: 15/221,361

(22) Filed: Jul. 27, 2016

(65) Prior Publication Data

US 2017/0142309 A1    May 18, 2017

(30) Foreign Application Priority Data

Jul. 31, 2015   (JP) .................. 2015-151922

(51) Int. Cl.
  *H04N 5/235*   (2006.01)
  *H04N 5/232*   (2006.01)
  *H04N 17/00*   (2006.01)

(52) U.S. Cl.
  CPC .......... *H04N 5/2351* (2013.01); *H04N 5/232* (2013.01); *H04N 5/2353* (2013.01); *H04N 5/23203* (2013.01); *H04N 5/23212* (2013.01); *H04N 5/23296* (2013.01); *H04N 17/002* (2013.01)

(58) Field of Classification Search
  CPC .. H04N 5/2351; H04N 5/232; H04N 5/23203; H04N 5/23212; H04N 5/23296; H04N 5/2353; H04N 17/002
  See application file for complete search history.

(56) References Cited

U.S. PATENT DOCUMENTS

| 2008/0024606 | A1  | 1/2008  | Kawasaki |
| 2010/0226544 | A1  | 9/2010  | Uchida et al. |
| 2015/0334267 | A1* | 11/2015 | Hirakawa ............ H04N 1/6086 348/242 |

FOREIGN PATENT DOCUMENTS

| JP | 2015-002522   |   | 1/2015 |
| JP | 2015002522 A  | * | 1/2015 |

OTHER PUBLICATIONS

Office Action from corresponding Japanese Patent Application No. 2015-151922, dated Apr. 26, 2019 (3 pgs.).

* cited by examiner

*Primary Examiner* — Anner N Holder
*Assistant Examiner* — Hesham K Abouzahra
(74) *Attorney, Agent, or Firm* — John C. Pokotylo; Pokotylo Patent Services

(57) ABSTRACT

An imaging apparatus, comprising a movement section having a thrust mechanism capable of movement, an imaging section that acquires image data, an imaging control section that acquires first image data using the imaging section with an examination chart under a first shooting condition, and that acquires second image data using the imaging section with a physical object under a second shooting condition, and a determination section for determining illuminated state for the physical object and the examination chart based on the first and second image data.

22 Claims, 12 Drawing Sheets

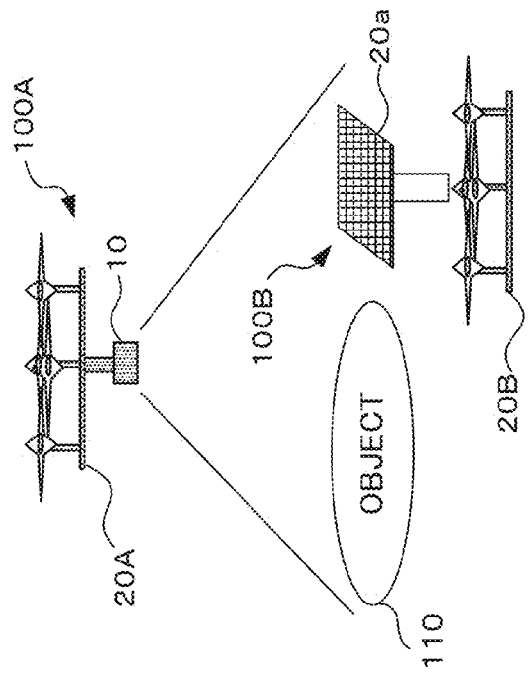
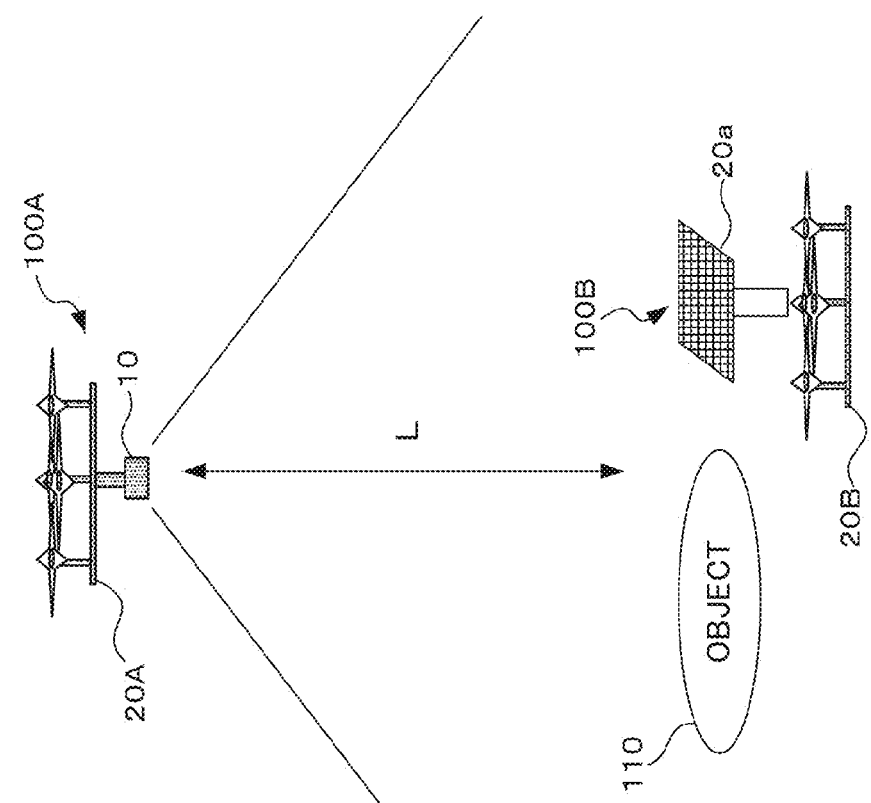

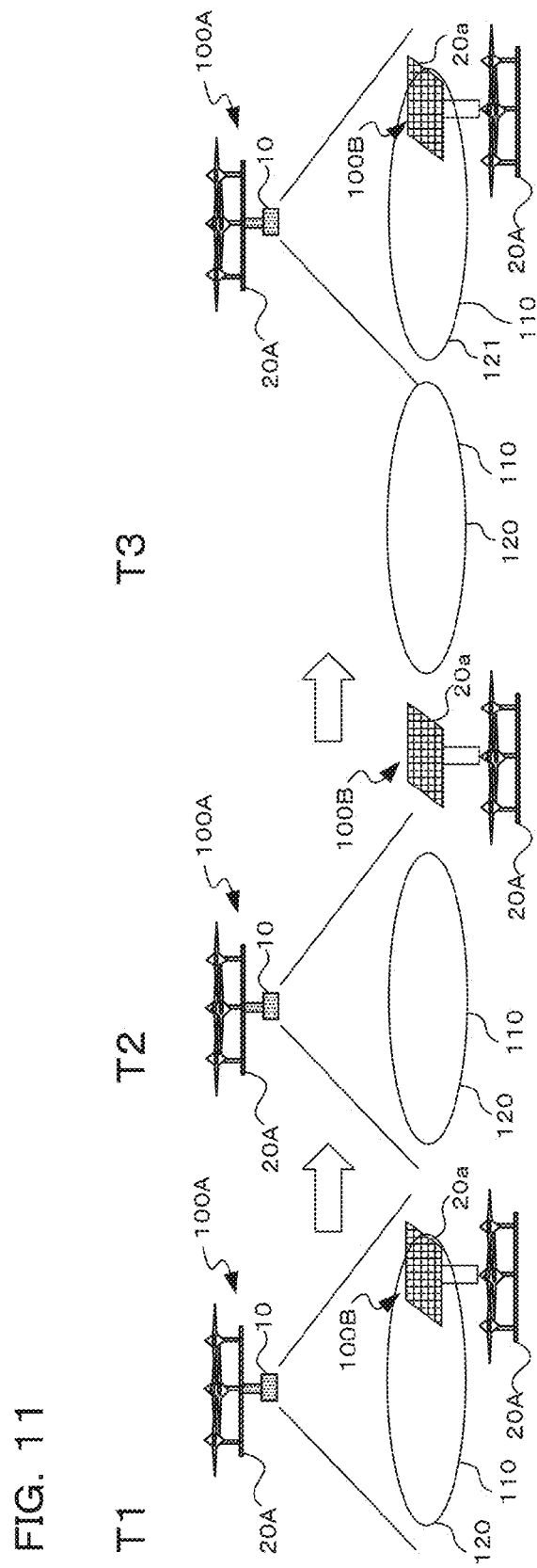

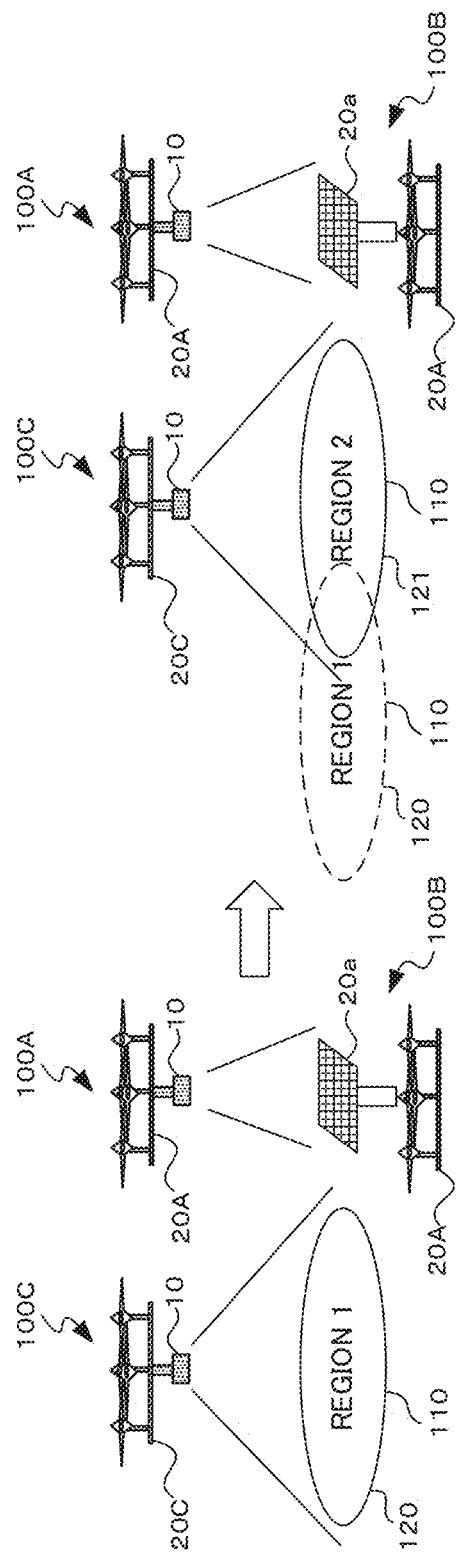

IMAGING APPARATUS AND IMAGING METHOD

Benefit is claimed, under 35 U.S.C. § 119, to the filing date of prior Japanese Patent Application No. 2015-151922 filed on Jul. 31, 2015. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus mounted on a moving body such as an aircraft in the sky, that forms an image of a color chart and a physical object with this moving body, and to an imaging method.

2. Description of the Related Art

Mounting an imaging apparatus in an unmanned aircraft or the like and forming an image of a monitored physical object has been proposed. For example, in Japanese patent laid open publication number 2015-2522 (hereafter referred to as "patent publication 1"), a surveillance camera has been proposed that can continue with monitoring while maintaining an appropriate angle of dip, even when a physical object has moved. With this surveillance camera, in the event that a monitored physical object has moved into a predetermined forbidden entry region, the camera is made to rise without carrying out horizontal movement and a lens controller maintains angle of dip of the surveillance camera by zooming to the telephoto end.

A monitored physical object may not be photographed only once, and there may be cases where observation is carried out over a period of time by photographing every day. With observation over time, the color of a monitored physical object may also change, and color of a taken image may also change in accordance with changes in the environment of the monitored physical object, such as a light source. In patent publication 1 described above, there is no mention regarding handling of environmental change.

SUMMARY OF THE INVENTION

An object of the present invention is to provide an imaging apparatus that can correctly monitor state of a monitored physical object, regardless of environmental change, and an imaging method.

An imaging apparatus of a first aspect of the present invention comprises a movement section having a thrust mechanism capable of movement, an imaging section that acquires image data, and an imaging control section that acquires first image data using the imaging section with an examination chart under a first imaging condition, and that acquires second image data using the imaging section with a physical object under a second imaging condition, and a determination section for determining illuminated state for the physical object and the examination chart based on the first and second image data.

An imaging apparatus of a second aspect of the present invention comprises a movement section having a thrust mechanism capable of movement, an imaging section, held in the movement section, that acquires image data, an examination chart held in the movement section, an imaging control section that acquires first image data using the imaging section with the examination chart under a first shooting condition, and that acquires second image data using the imaging section with a physical object under a second shooting condition, and a determination section for determining illuminated state for the physical object and the examination chart based on the first and second image data.

An imaging apparatus of a third aspect of the present invention comprises a movement section having a thrust mechanism capable of movement, an examination chart held in the movement section, an imaging section that acquires image data, and a communication section that performs communication, wherein the movement section moves to a position where first image data, including the examination chart, has been acquired by the imaging section, and after the first image data has been acquired by the imaging section moves to a position that s different to a position at the time of acquisition of the first image data.

An imaging method of a fourth aspect of the present invention comprises a first imaging step of forming an image of an examination chart under a first shooting condition and acquiring first image data, a second imaging step of forming an image of a physical object under a second shooting condition, and acquiring second image data, and a determination step of determining illuminated state for the physical object and the examination chart based on the first and second image data.

An imaging method of a fifth aspect of the present invention comprises a movement step of moving with a remote operation so as to change position of the examination chart, a first imaging step of determining position of the examination chart and shooting the examination chart, and a second imaging step of imaging a physical object.

BRIEF DESCRIPTION OF THE DRAWINGS

FIG. 10A and FIG. 10B are drawings for explaining a first modified example of the second embodiment of the present invention, and are drawings for explaining the difference in size of a color chart in accordance with distance at the time of imaging.

FIG. 11 is a drawing for explaining a first modified example of imaging of the second embodiment of the present invention.

FIG. 12 is a drawing for explaining a second modified example of imaging of the second embodiment of the present invention.

DETAILED DESCRIPTION OF THE PREFERRED EMBODIMENTS

An imaging system, having a camera mounted on an unmanned aircraft that is capable of being remotely operated, or being operated according to a stored flight plan, or autonomously, or by some other method, and that carries out imaging with this camera, will be described in the following as a preferred embodiment of the present invention. Description of the preferred embodiment will be based on the fact that state observation of a physical object will be carried out by shooting pictures. However, this is not limiting and the present invention can be used effectively even in cases where an image is observed visually. Also, "shooting pictures" is not limited to the case of storing imaging results and may also include the fact that there may be cases where imaging results are not stored. Also, with this embodiment, description is given of an example where an aircraft has been adopted as a movement section, but the present invention is not limited to an aircraft and is also capable of being applied to a robot, a machine capable of land-based movement, or a machine capable of movement in water. The present invention is also effective in space exploration, and application to rockets and man-made satellites is also promising. Also, with this embodiment description has been given of an example where the movement section is remotely operated, but remote operation is also not a prerequisite, and the present invention can also be adopted in devices in which operations made by a person can be performed automatically as a result of programming.

Figure 1:
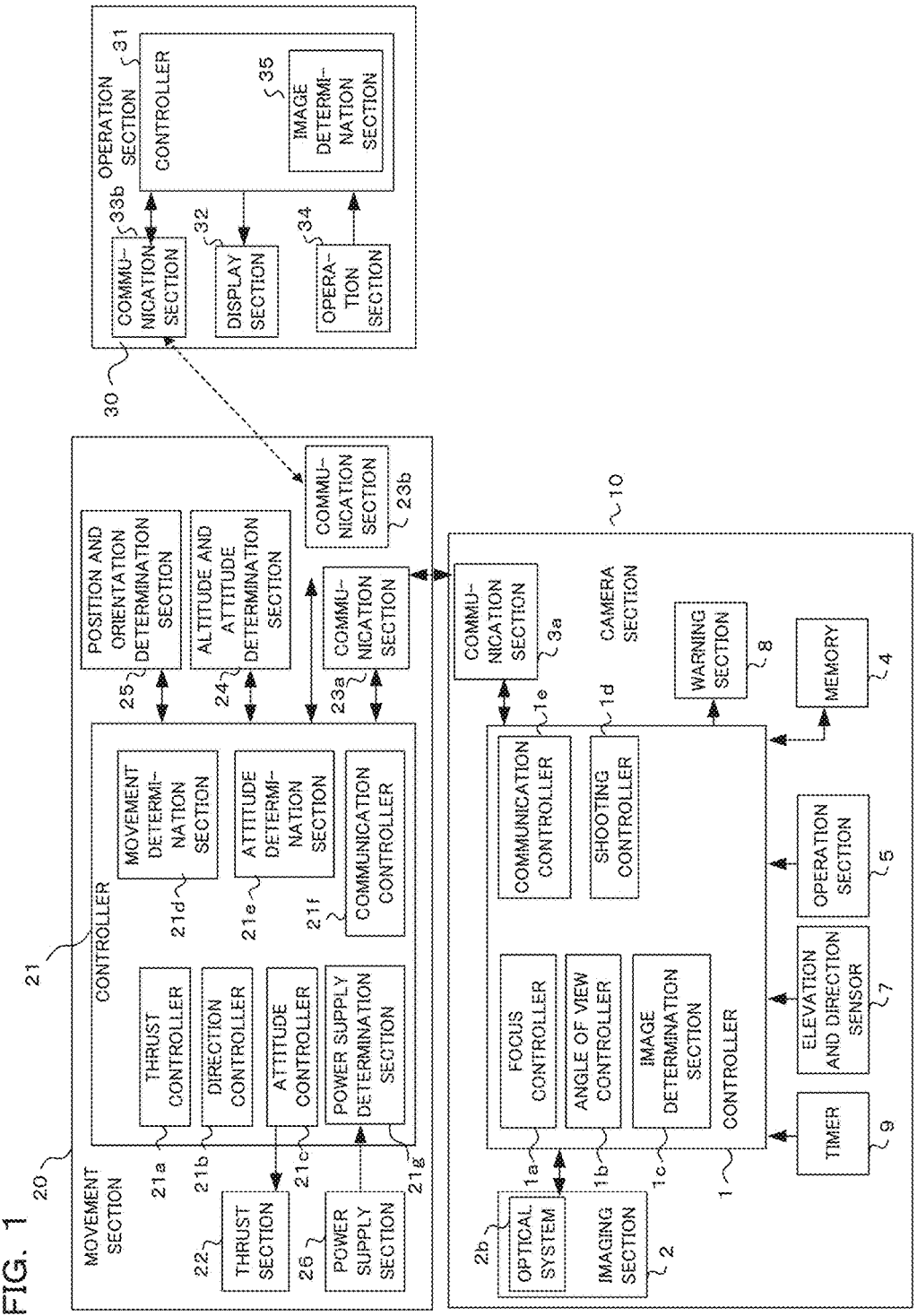
FIG. 1 is a structural block diagram showing an overview of the electrical structure of an imaging system, made up of an unmanned aircraft and a camera, of a first embodiment of the present invention.

FIG. 1 is a block diagram mainly showing the electrical structure of the imaging system of this embodiment. This imaging system has a movement section 20 which is an unmanned aircraft, a camera section 10 that is held on this movement section 20, and an operation section 30 for remotely operating the movement section 20. If the movement section 20 has a function of an automatic flight control, the operation section 30 may be omitted. Further, the architecture of the camera section 10 and the movement section 20 may be integrated into a single unit.

The camera section 10 comprises a controller 1, an imaging section 2, a communication section 3a, a memory 4, an operation section 30, an elevation and orientation sensor(s) 7, a warning section 8 and a timer 9. This camera section 10 shoots photographs of a physical object 110 and a color chart 20a, as will be described later (refer, for example, to FIG. 2).

The imaging section 2 comprises an optical system 2b, an image sensor for subjecting an image of a physical object that has been formed by this optical system to photoelectric conversion, an imaging control circuit for carrying out imaging control of this image sensor, and imaging processing circuits etc. for processing image data from the image sensor. The imaging section 2 carries out imaging in accordance with control from the controller 1, and outputs image data that has been acquired by the image sensor to the controller 1. The imaging section 2 functions as an imaging section for acquiring image data. The imaging section 2 also stores images for examination, and, in the case of monitoring, is also capable of detecting wavelengths outside of the visible spectrum. This can be realized by appropriate selection of optical filters or image sensors.

The controller 1 includes a CPU (Central Processing Unit), peripheral circuits for the CPU, and memory, and functions of a focus controller 1a, angle of view controller 1b, image determination section 1c, shooting controller 1d and communication controller 1e are realized using software and hardware.

The focus controller 1a carries out focusing of the optical system 2b within the imaging section 2. As a focusing method, for example, a contrast evaluation value is calculated using image data from the imaging section 2, and focus adjustment of the optical system 2b is carried out so that this contrast evaluation value becomes a peak. As well as this method, some pixels of the image sensor may be made phase difference pixels, and focusing carried out by phase difference AF using a pixel signal from the phase difference pixels.

The angle of view controller 1b controls focal length of the optical system 2b in accordance with instruction from the operation section 30 (directly or via the movement section 20) or an automatic flight objective program. As will be described later, with this embodiment, shooting is carried out at a wide angle of view (wide-angle) and at a tele angle a view (telephoto angle of view) (refer to FIG. 3).

Using the image data from the imaging section 2, the image determination section 1c checks that there are no shadows or the like (or more than a predetermined amount of shade or shadows) in an image taken by the movement section 20 etc. and that no reflections of light such as sunlight or the like (or more than a predetermined amount of glare) appear in the image. Alternatively, or in addition, shadows and/or glare may be determined, for example, based on a shape or shapes of shadow or glare, and/or based on a pattern of shadow or glare. Alternatively, or in addition, the presence of shadow and/or glare may be determined based on machine learning or artificial intelligence (such as, for example, decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, etc.), in which a machine is "trained" to determine the presence of shadow or glare based on previously evaluated (e.g., by a human or humans) image data. Such processing may be performed in the camera section 10, or remotely. If done remotely, data and/or results can be communicated wirelessly. A determination result by the image determination section 1c is transmitted by means of the communication section 3a to the operation section (operation section 30) for operating the movement section 20. It should be noted that besides being carried out by the image determination section 1c within the camera section 10, image determination may also be carried out using the image determination section 35 within the operation section 30.

The shooting controller 1d, when acquiring the image data from the imaging section 2, carries out exposure control such as shutter speed and aperture value, and carries out storage control of image data that has been acquired, such as for a still picture or a movie. The shooting controller 1d functions as an imaging control section that acquires first image data using the imaging section with an examination chart under a first shooting condition, and that acquires second image data using the imaging section with a physical object under a second shooting condition. With this embodiment, the first shooting condition and the second shooting condition described above are made identical (refer, for example, to FIG. 6 or S41 and S47 in FIG. 9). The controller 1 functions as a determination section that determines illuminated state of a physical object and an examination chart based on the first and second image data (refer, for example, to S43 or S49 in FIG. 6 or in FIG. 9).

It should be noted that in cases of using a color chart as an examination chart, an infrared region and an ultraviolet region can also be measured, and if a reflectance at each wavelength is assumed, and it is not necessary to limit to colors in the visible region. Also, when storing data in the memory 4, the data may be made into files and contained in a storage control section for storage. In this case, the controller 1 provides a function as a storage control section.

The communication controller 1e carries out control of communication with the movement section 20 by means of the communication section 3a within the camera section 10. The communication section 3a carries out communication with the communication section 23a within the movement section 20. Wireless communication such as WiFi or Bluetooth may be carried out between the camera section 10 and the movement section 20, but with this embodiment wired communication is carried out using USB (Universal Serial Bus). Image data that has been acquired by the imaging section 2 can be displayed on the display section 32 of the operation section 30 by means of the communication section 3a of the camera section 10, the communication sections 23a and 23b of the movement section 20 and the communication section 33b of the operation section 30.

The memory 4 has a storage control section, and stores image data that has been acquired by the imaging section 2. The memory 4 functions as a storage control section for generating and storing image files that associate first image data and second image data. The storage control section of the memory 4 may store not only the image data, but also the image data in combination with supplemental information such as time of imaging or time of shooting, and the data may also be made into files for storage. In this case, a plurality of images are associated with each other and stored. That is, input of information in accordance with a format that has been designated within an image file, or creation of a file representing the association, is carried out. Also, time and date of shooting, audio and temperature at that time etc. are stored as meta data of the image file, and if made in to a file it will enhance admissibility as evidence of storage. In this case, since audio and temperature are stored, a microphone for acquiring audio and a thermometer for measuring temperature may be provided within the camera section 10.

The memory 4 may also record information, etc., held by the moving body (movement section 20) that has been acquired by means of the communication section 3a. For example, as well as operational results, operation processes, movement history, position, altitude, orientation, elevation, wind speed and movement velocity where the operation took place, the moving body is capable of acquiring the time of those operations as accurate data based on GPS data, etc. If these items of data are kept and referenced as storage of shooting time and observation time, they can be effectively utilized as supplemental information for at the time of image observation, viewing and determination. These items of supplemental information should be identifiable as having been acquired from a moving body. Since items of data may depend on the type of moving body, providing such items together with type information for the moving body and stored as supplemental data enables a user to make reliable determination In this way, under conditions for operating, observing and shooting remotely, there are factors should be considered other than light source, such as environmental changes to an object to be monitored, and are further factors relating to other than an object to be monitored, namely environmental changes on the measurement side. There has therefore been a desire for a shooting system that takes into consideration an object to be monitored and factors other than the object to be monitored.

The operation section 5 may have manual operation members for operating the camera section 10, such as a power supply switch and release button etc. Besides remote operation using the operation section 30 it is also possible to carry out operation of the camera section 10 using this operation section 5.

The elevation and orientation sensor(s) 7 detects an orientation in which the optical system 2b of the camera section 10 is facing and an elevation angle from the horizon, and outputs the results of such detection to the controller 1. The warning section 8 has a display section for visually warning or a sound generating section for audibly warning or the like, and carries out warning display. At the time of remote operation, warning display is carried out in the operation section 30, but warning display may also be carried out in the camera section 10. The timer 9 outputs time and date information, and attaches this time and date information to image data. Since this time and date information and supplemental information may sometimes be erroneous, and the information might not be completely consistent between the camera section 10 and the movement section 20, information may be rewritten on both sections and attached using a communication function, only the information having highest reliability may be attached, or information may be entered so as to identify which section data has been acquired from.

The movement section 20 comprises the controller 21, thrust section 22, communication section 23a and communication section 23b, altitude and attitude determination section 24, position and orientation determination section 25, and power supply section 26. The movement section 20 can fly freely in the air like a helicopter using the thrust section 22. The movement section 20 functions as a movement section having a thrust mechanism that is capable of being moved by remote operation, or being operated according to a stored flight plan, or autonomously, or by some other method. This movement section, in the event that it has been determined by the determination section that an illuminated state is different, moves within an allowable range and the imaging control section carries out shooting again (refer, for example, to S23 of FIG. 5 or of FIG. 8).

Figure 2:
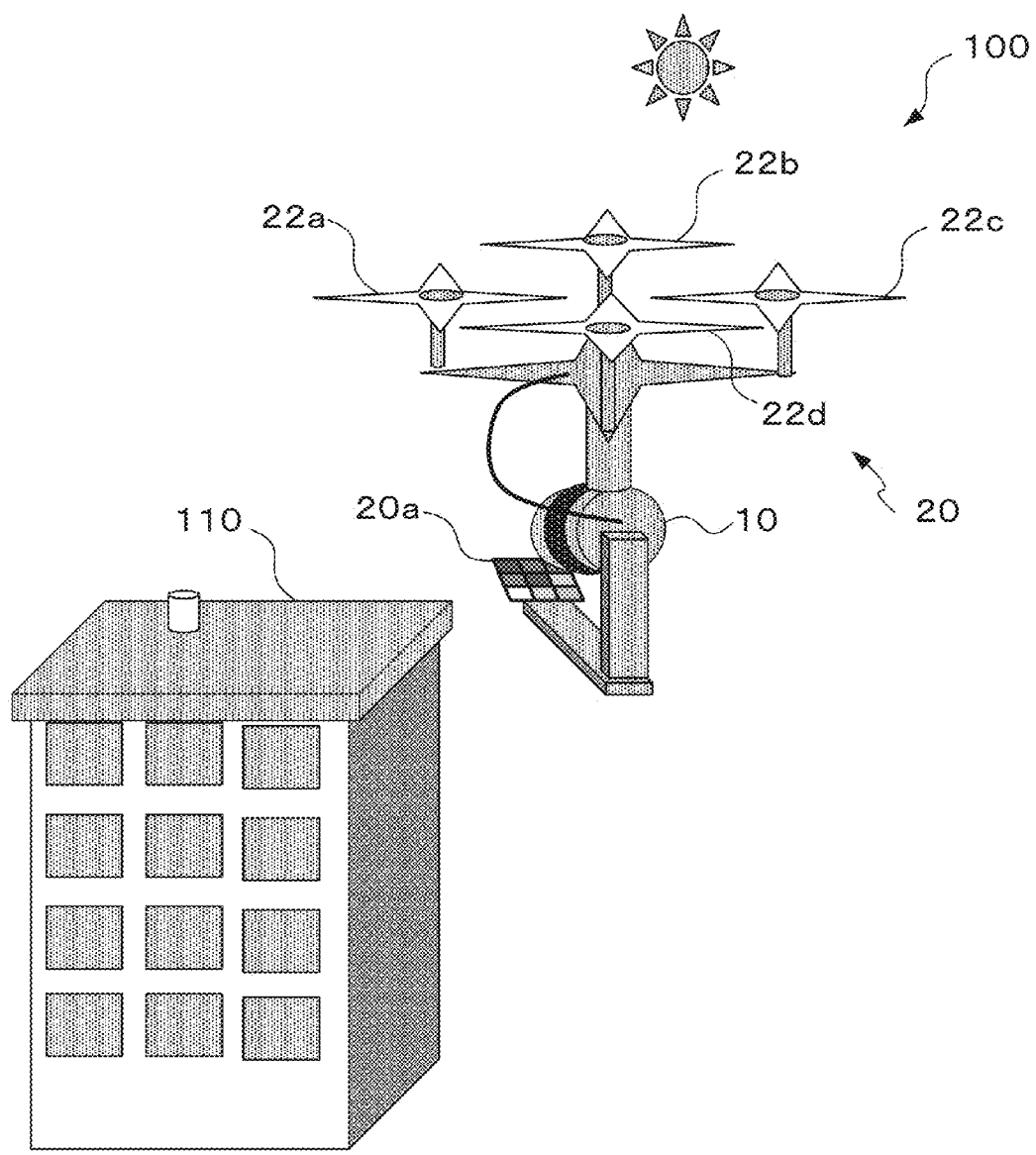
FIG. 2 is a drawing showing a usage state of the imaging system of the first embodiment of the present invention.

The thrust section 22 has a thrust mechanism for flying through the air, such as a rotary vane (propeller). It should be noted that with this embodiment, as shown in FIG. 2, there are 4 rotary vanes, and by controlling these 4 rotary vanes upward, downward, forward, backward etc. movement is carried out.

The controller 21 includes a CPU and peripheral circuits and memory for the CPU, and functions of the thrust controller 21a, direction controller 21b, attitude controller 21c, movement determination section 21d, attitude determination section 21e, communication controller 21f, and power supply determination section 21g are realized using software and hardware. The controller 21 carries out flight control of the movement section 20 in accordance with manual operations and/or an automatic flight objective program from the operation section 30. Also, when in the vicinity of a shooting location, shooting is carried out in the camera section 10 by carrying out camera communication. With this embodiment the automatic flight objective program is transmitted in its entirety from the operation section 30 before flight commencement, but this is not limiting, and the automatic flight program may be transmitted sequentially during flight.

The thrust controller 21a controls the thrust section 22 in accordance with instructions from the operation section 30. The movement determination section 21d determines movement direction of the movement section 20. The direction controller 21b receives a result of movement determination by the movement determination section 21d and controls movement direction of the movement section 20. The attitude determination section 21e determines attitude of the movement section 20. The attitude controller 21c receives a result of attitude determination by the attitude determination section 21e and carries out control of attitude of the movement section 20.

The power supply determination section 21g determines power supply state of the power supply section 26 that carries out supply of power within the movement section 20. In the event that an automatic flight objective program is received from the operation section 30, it is determined whether or not there is sufficient power for flight of the movement section 20 with this received program. Also, if a power supply voltage of the power supply section 26 is less than a specified voltage, warning display is carried out in the camera section and/or the operation section 30. The communication controller 21f carries out control of communication with the camera section 10 by means of the communication section 23a of the movement section 20, and carries out control of communication with the operation section 30 by means of the communication section 23b of the movement section 20.

The communication section 23a carries out communication with the communication section 3a within the camera section 10, and while this communication may be carried out wirelessly, in this embodiment, as was described previously, communication is carried out in a wired manner. The communication section 23b carries out wireless communication such as WiFi or Bluetooth with the communication section 33b within the operation section 30. Instructions relating to operation from the operation section 30 are performed by means of this communication section 23b. Also, as was described previously, image data from the camera section 10 is also transmitted to the operation section 30 by means of the communication section 23b. At this time, data that has been acquired at the operation section 30 is transmitted to the camera section 10 and this data may be made supplementary information for an image file.

The altitude and attitude determination section 24 detects altitude of the movement section 20 based on, for example, voltage change or the like, and detects attitude of the movement section 20 based on a gyro or the like, and outputs information relating to the detected altitude and attitude to the movement section 20. The position and orientation determination section 25 detects position and orientation of the movement section 20 using GPS (Global Positioning System) and outputs to the controller 21.

The operation section 30 comprises a controller 31, display section 32, communication section 33b and operation section 34, and is capable of carrying out flight control for the movement section 20 and carrying out shooting control of the camera section 10. The operation section 30 may be a dedicated unit for operation, and may also use a general purpose unit such as a personal computer (PC). It should be noted that since the operator will be concentrating on safe visual flight of the movement section 20, leaving little time for the checking of shooting results and the like, with this embodiment shooting determination is carried out semi-automatically.

The controller 31 includes a CPU and peripheral circuits and memory for the CPU, and realizes functions of the image determination section 35 using software and hardware. The image determination section 35 checks that no shadow or the like has occurred in an image due to the movement section 20 etc., using image data that has been received by means of the communication section 33b.

The operation section 34 carries out various operations such as raising, lowering, forward travel and reverse travel etc. of the movement section 20 based on manual operations by the user for causing the movement section 20 to fly. The operation section 34 can also carry out setting of the automatic flight objective program in advance. Specifically, it is possible to designate departure location, flight route (including altitude) and arrival location, and it is also possible to carryout instructions for such as shooting location (including altitude) and shooting direction during this flight route. The operation instructions and automatic flight objective program are transmitted to the controller 21 of the movement section 20 by means of the communication section 33b and communication section 23b, and the controller 21 carries out drive control of the movement section 20 in accordance with the manual operations and the automatic flight objective program from this operation section 34.

The communication section 33b carries out wireless communication such as Wi-Fi with the communication section 23b within the movement section 20. As has been described previously, operating instruction from the operation section 34 are transmitted via this communication section 33b to the movement section 20, and image data from the camera section 10 is received via the communication section 33b. The display section 32 performs various display for operation of the movement section 20, and performs image display based on image data from the camera section 10.

Next, a method of use for the imaging system 100 of this embodiment will be described using FIG. 2 to FIG. 4B. With the example shown in FIG. 2, propellers 22a-22d are provided as the thrust section 22. The camera section 10 and the color chart 20a are held in the movement section 20, with the color chart 20a being arranged within a shooting range of the optical system 2b of the camera section 10. The color chart 20a functions as an examination chart retained in the movement section.

The color chart 20a has a plurality of color patterns, with color samples being arranged in each cell. With this example, as will be described later, the camera section 10 is respectively capable of shooting images of both the color chart 20a and the physical object 110 (such as, for example, the roof of a building), and of shooting an image of only the physical object 110. Using color samples of the color chart 20a it is possible to check color reproducibility of the image of the physical object 110, and it becomes possible to calibrate color (hue, saturation, brightness etc.) of the physical object 110.

Figure 3:
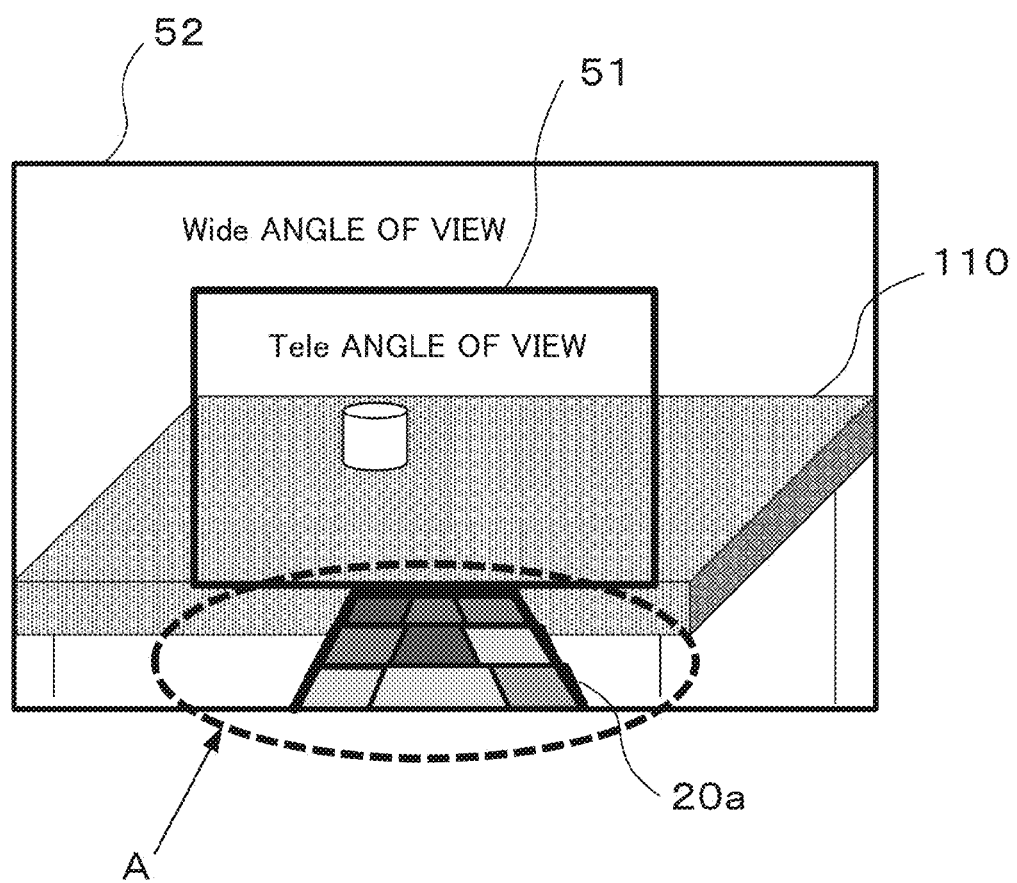
FIG. 3 is a drawing showing an image that has been acquired by the imaging system of the first embodiment of the present invention.

FIG. 3 shows an example of an image acquired in the imaging section 2 at a time when the imaging system has been moved to an appropriate location and the camera section 10 is oriented properly. The camera section 10 also shoots the color chart 20a at the time of shooting the physical object 110. Specifically, the angle of view controller 1b sets focal length of the optical system 2b to a short focal length side and shoots at a Wide angle of view 52. When shooting, a region A that contains the color chart 20a is made a light measuring region, and exposure control is carried out for this region A so as to achieve correct exposure. An image that has been taken at this Wide angle of view 52, at the time when the imaging system has been moved to an appropriate location and the camera section 10 is oriented properly, is stored as an image for color comparison. The image for color comparison may also be subjected to combined display within the taken image (stored image, observation image) as a result of image processing.

Also, for the physical object 110, the angle of view controller 1b sets the focal length of the optical system 2b to a long focal length side and performs shooting at a Tele angle of view 51 (e.g., at the time when the imaging system has been moved to an appropriate location and the camera section 10 is oriented properly), and stores this image. When shooting at this Tele angle of view 51 also, exposure control values are the same as for at the Wide angle of view 52. This means that when carrying out color comparison of the color chart 20a within the image that has been taken at the Wide angle of view 52 with the physical object 110, it becomes easier to observe changes in color of the physical object 110 due to change over time. Also, using the color chart 20a it is possible to correct color of an image that has been taken at the Tele angle of view 51. If display is carried out by normalizing afterward, it becomes possible to correct variation in exposure conditions to some extent, and to examine the brightness of the color chart.

Figure 4A:
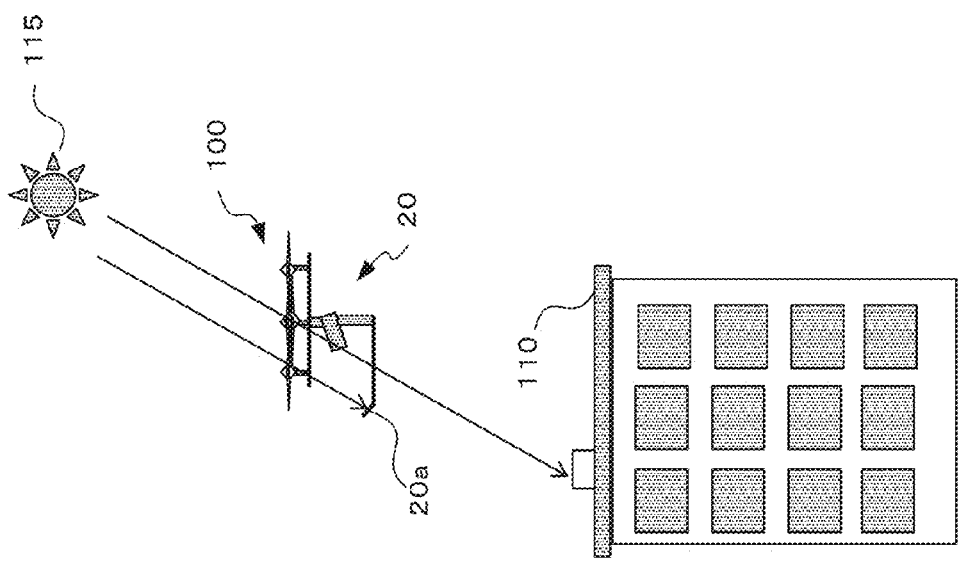
FIG. 4A and FIG. 4B are drawings for explaining imaging, in the imaging system of the first embodiment of the present invention.
Figure 4B:
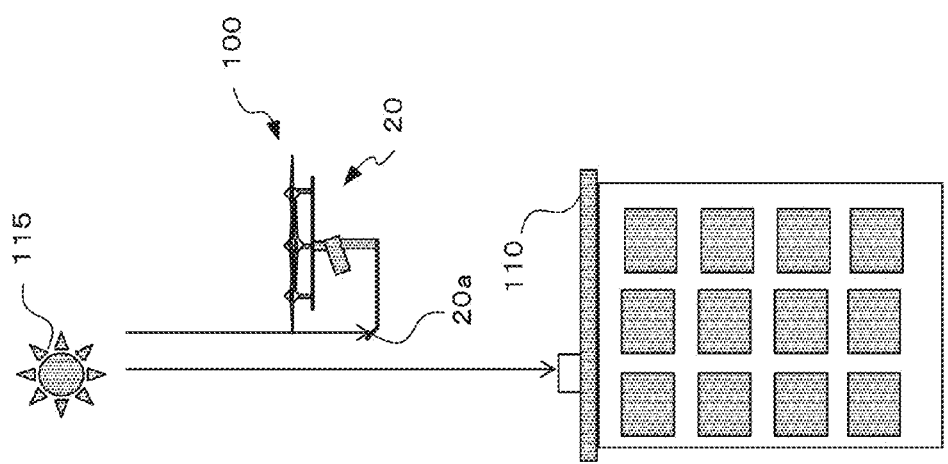

FIG. 4A and FIG. 4B show one example of an imaging method used in the imaging system 100 of this embodiment. FIG. 4A shows a case where sunlight from the sun 115 is directly irradiating the physical object 110 and the color chart 20a, while FIG. 4B shows a case where color chart 20a and the physical object 110 are in the shade of sunlight from the sun 115. In the case of FIG. 4A, shooting is carried out because the color chart 20a and the physical object 110 are subjected to the same illumination. Conversely, with the case of FIG. 4B shooting is not carried out because both the color chart 20a and the physical object 110 are in shadow (refer to S43 and S49 in FIG. 6). Without being limited to sunlight, it can be said that if the illuminating light is the same for both the color chart and the physical object, shooting is carried out. With this embodiment examination is possible independently of the wavelength of a light source.

Next, operation of the movement section 20 of this embodiment will be described using the flowchart shown in FIG. 5. This flow is executed by the CPU within the controller 21 of the movement section 20 controlling each section within the movement section 20 in accordance with a program that has been stored in memory within the controller 21.

Figure 5:
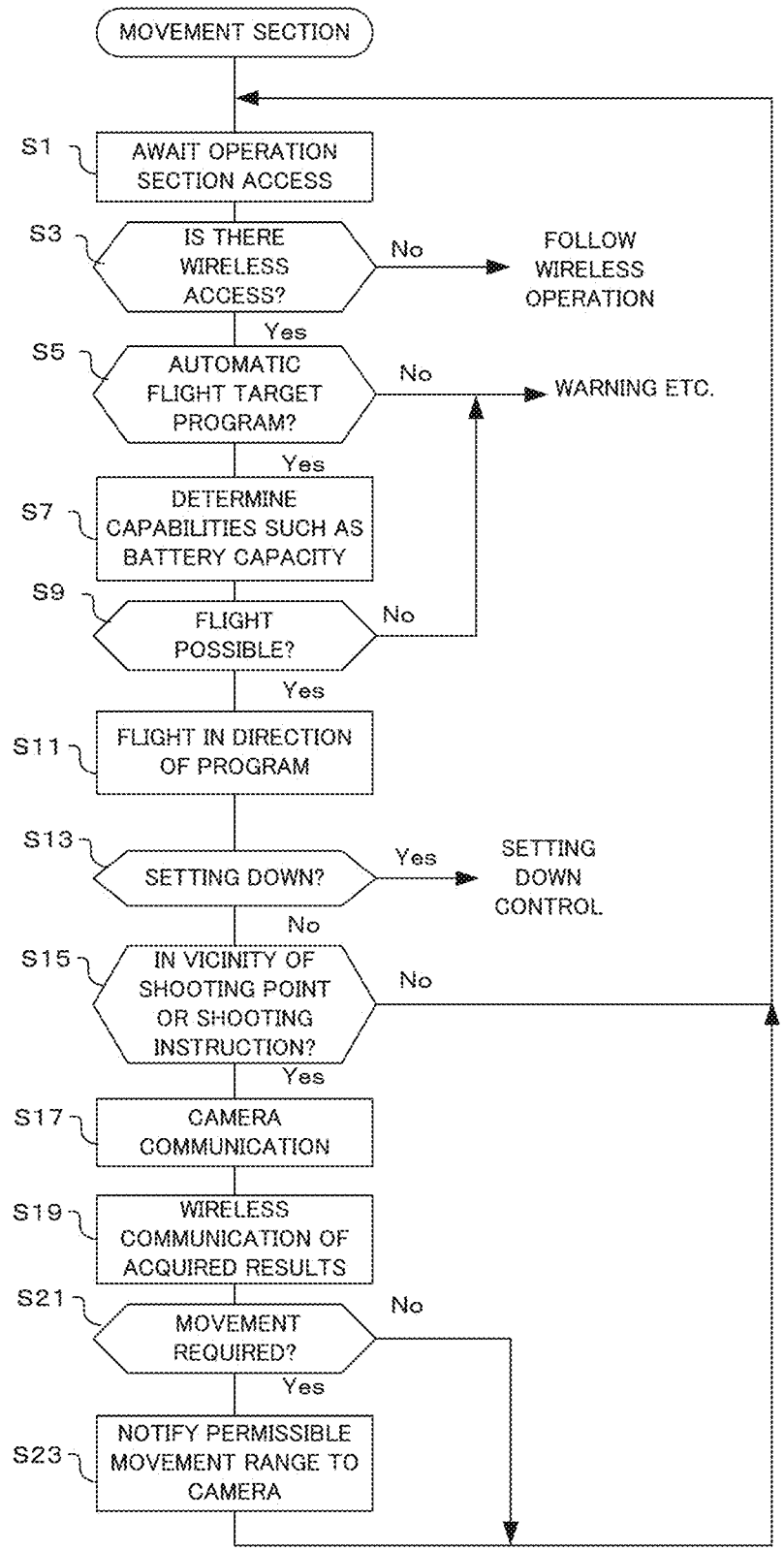
FIG. 5 is a flowchart showing operation of a movement section of the imaging system of the first embodiment of the present invention.

The flow shown in FIG. 5 is entered once the power supply of the movement section 20 is turned on. First, access from the operation section 30 is awaited (S1). Here communication from the operation section 30 via the communication section 33b and the communication section 23b is awaited.

It is next determined whether or not there is a wireless access (S3). Here it is determined whether or not there has been an access from the operation section 30 via the communication section 33b and communication section 23b. If the result of this determination is that an operation instruction has been received from the operation section 30 due to a manual operation, flight control is carried out in accordance with wireless operation.

If the result of determination in step S3 is that there is no wireless access, it is determined whether or not to carry out flight in accordance with an automatic flight objective program (S5). Here determination is based on whether or not an automatic flight objective program has been received in advance from the operation section 30. If the result of this determination is that an automatic flight objective program has not been received, display of a warning or the like is carried out.

In the event that the result of determination in step S5 is automatic flight objective program, capability determination such as battery capacity etc. is carried out (S7). Here, the power supply determination section 21g determines whether or not there is sufficient electrical power stored in the power supply section 26 when carrying out flight using the automatic flight objective program.

It is then determined whether or not flight is possible (S9). Here, determination is based on the determination in step S7. If the result of this determination is that flight is not possible, warning display or the like is carried out.

If the result of determination in step S9 is that flight is possible, flight is carried out in line with a program (S11). A flight history for when flight has taken place is stored, and this flight history can be stored for causal analysis for safety aspects or at the time of an accident, but this is not limiting, and the flight history may also be stored for use in situational analysis at the time of shooting. Here, the controller 21 commences flight in line with a flight route in accordance with an automatic flight objective program that has been transmitted from the operation section 30. Also, image data that has been acquired by the camera section 10 during flight is transmitted to the operation section 30 via the communication section of the movement section 20, and images are displayed on the display section 32. The capacity for image data at this time may be small compared to the capacity for image data that will be acquired when shooting in steps S41 and S47 in FIG. 6.

Next it is determined whether or not the aircraft is to be set down (S13). Here it is determined whether or not setting down is incorporated in the automatic flight objective program, or whether or not an instruction for setting down has been performed manually from the operation section 30. If the result of this determination is that there is to be setting down, there is a transition to flight control for setting down.

If the result of determination in step S13 is that there is to be no setting down, it is next determined whether the aircraft is in the vicinity of a shooting point (e.g., the imaging system has been moved to an appropriate location and the camera section 10 is oriented properly), or whether or not a shooting instruction has been performed (S15). Images that have been acquired by the camera section 10 are displayed on the display section 32 of the operation section 30, and in the event that the operator wishes to perform shooting, a shooting instruction is performed using the operation section 34. If this shooting operation has been received via the communication section, in this step it is determined (e.g., inferred by the receipt of a operator shooting command) that the aircraft is in the vicinity of a shooting point (e.g., the imaging system has been moved to an appropriate location and the camera section 10 is oriented properly). Also, in the event that a shooting location has been set in the automatic flight objective program and if the imaging system is at the shooting location (and its camera section 10 is oriented properly), in this step a shooting instruction is determined. If the result of this determination is No, processing returns to step S1.

On the other hand, if the result of determination in step S15 is Yes, camera communication is carried out (S17). Here, in order to carry out shooting, the movement section 20 carries out communication with the camera section 10 by means of the communication section 23a, and carries out an instruction for shooting in the camera section 10 (refer, to S35 in FIG. 6). In the communication with the camera at this time, together with data of the moving body (movement section 20) (including type of equipment etc.), data and information etc. that has been acquired by the moving body is transmitted to the camera 10, and by storing these items of data and information in tags of the image data the value as information is increased, searchability is improved, and it becomes possible to reference as supplemental information at the time of examination. This type of supplemental information is not limited to being exchanged with the movement section 20, and convenience is further increased if it is in a format such that the color chart 20a, angle and type of the camera section 10, and weather information that has been acquired by the operation section 30, etc. is stored collectively.

Next, acquired results are wirelessly communicated (S19). The camera section 10 carries out shooting, and once image data has been acquired transmits the image data to the movement section 20. In this step, the movement section 20 transmits the image data that has been acquired from the camera section 10 to the operation section 30 by means of the communication section 23b and the communication section 33b. It is possible to display the taken images on the display section 32 of the operation section 30.

Next it is determined whether or not movement is required (S21). In the camera section 10 the image determination section 1c determines whether shadows have occurred or reflections of light such as sunlight appear on the color chart 20a, and whether shadows have occurred or noise portions due to reflections appear on the physical object 110, based on the image data that has been acquired by the imaging section 2, and in the event that shadows or reflections have occurred the fact that movement is required is transmitted (refer to S51 in FIG. 6). In this step determination is based on communication from the camera section 10. It should be noted that determination as to whether or not shadows have occurred on the color chart 20a and the physical object 110 can be judgments using specific shading patterns and change determinations for those patterns (caused by change in position and time), and may also be carried out in the image determination section 35 within the operation section 30.

If the result of determination in step S21 is that movement is required, the movement section 20 is moved in a permissible range and notifies the fact that movement has taken place to the camera (S23). Here, the movement section 20 is moved in a range where there is no collision with or approach to the physical object 110. Once movement is completed, the fact that movement has been completed is notified to the camera section by means of the communication section 23a and the communication section 3a. For example, positions where shadows and reflected light occur under sunlight (shading pattern) will change position due to movement, and so from this type of viewpoint, determinations as to whether or not a measurement position is appropriate, and whether or not movement is required are simple.

If the moving section 20 is moved in a permissible range and this fact is notified to the camera in step S23, or if the result of determination in step S21 is that movement is not required, processing returns to step S1. In the event that there has been movement in the permissible range, shooting is carried out again at the position that has been moved to. The previously described shooting is also repeated if the next shooting point is approached or a shooting instruction is performed.

In this way, regarding operation of the movement section 20, if the shooting instruction is issued manually from the operator, or if a shooting position that has been set in advance in an automatic flight objective program is arrived at, a shooting instruction is issued to the camera section 10 and shooting is carried out (refer to S17).

Also, in the event that shadows have occurred on the color chart 20a or the physical object 110, based on this taken image, the camera section 10 is moved (refer to S21 and S23). This is because if shadows arise in the color chart 20a and the physical object 110, color reproducibility becomes bad, it is not possible to determine correct timing changes and changes before and after the physical object 110 is imaged. For example, if the physical object 110 is a building, house, or bridge, and specified construction work is carried out, such as colors, blemishes and flaws or the like of structures, and it therefore becomes difficult to discover locations where repair and maintenance (including the specifying of observation sites) to buildings and structures such as the rooftops of buildings and houses, and bridges etc. is required. In particular, in a case where there are shadows on only one of either the color chart 20a or the physical object 110, observation by contrasting the two becomes difficult.

Next, operation of the camera section 10 of this embodiment will be described using the flowchart shown in FIG. 6. This flow is executed by the CPU within the controller 1 of the camera section 10 controlling each section within the camera section 10 in accordance with a program that has been stored in memory within the controller 1.

Figure 6:
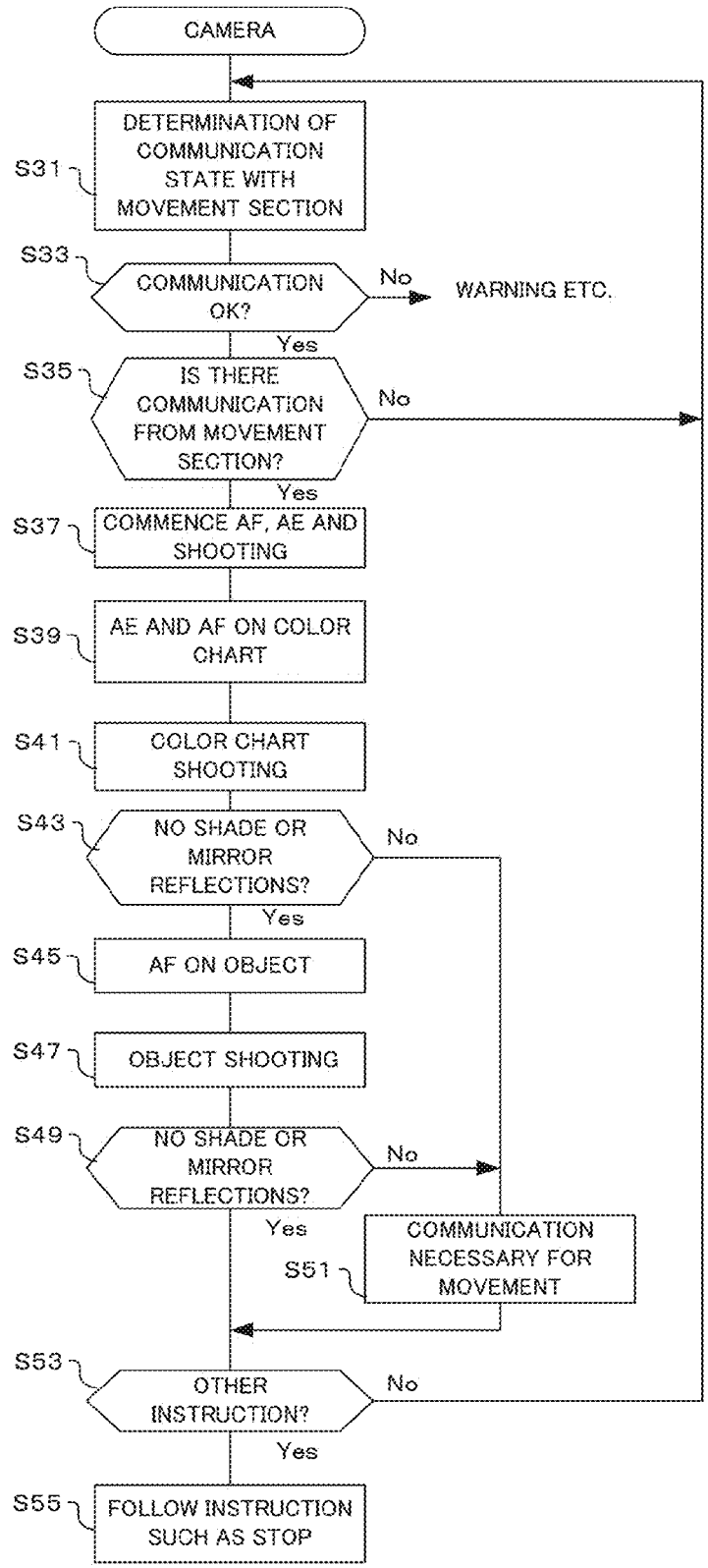
FIG. 6 is a flowchart showing operation of a camera of the imaging system of the first embodiment of the present invention.

If the power supply of the camera section 10 is turned on, the flow shown in FIG. 6 is commenced. First, determination of communication state with the movement section 20 is carried out (S31). Here, the communication section 3a of the camera section 10 carries out communication via the communication section 23a of the movement section 20.

It is next determined whether or not communication is OK (S33). Here, determination as to whether or not communication is OK is based on communication state with the movement section 20 in step S31. If the result of this determination is that communication is not OK, a warning or the like is carried out. The warning may be displayed on the warning section 8 and may be carried out on the display section 32 of the operation section 30.

If the result of determination in step S33 is that communication is okay, it is next determined whether or not there is communication from the movement section 20 (S35). As described previously, in the event that a shooting point is approached or there is a shooting instruction in step S15 and S17 of FIG. 5, the movement section 20 notifies the camera section 10 of such an event. In this step, it is determined whether or not this communication has been performed. If the result of this determination is that there is no communication, processing returns to step S31. At this time the presence or absence of shadows or reflections may also be notified to the operation section 30 by means of communication. Navigating safely is important from the viewpoint of the operator, and the presence or absence of shadows is preferable in terms of making it possible to carry out determination rapidly without the need to look at a screen. It also becomes possible to carry out examination without the transmission of imaging results (images). In this case it is better to review stored results after completion of a flight.

On the other hand, if the result of determination in step S35 is that there is communication, AF, AE, and shooting are commenced (S37). Here the focus controller 1a carries out focusing of the optical system. 2b (AF), the shooting controller 1d carries out exposure control (AE), and imaging is commenced using the imaging section 2. Image data that has been acquired by imaging is transmitted to the operation section 30 by means of the communication section 23b of the movement section 20.

Next, AE and AF are carried out on the color chart 20a (S39). Here AF control is carried out so as to focus on the color chart 20a, and AE control is carried out so as to achieve appropriate exposure.

Next shooting of the color chart is carried out (S41). Here shooting of an image that contains the color chart 20a is carried out at exposure control values, such as a shutter speed value and aperture value, that have been determined by the AE control. Specifically, image data of an image that contains the color chart 20a is acquired at a Wide angle of view 52 such as shown in FIG. 3.

Once shooting of the color chart has been carried out, it is next checked that there are no shadows and/or reflections (S43). Here it is determined by the image determination section 1c whether or not shadows or reflections appear on the image that has been taken of the color chart 20a.

If the result of determination in step S43 is that there are no shadows or reflections, next AF is carried out on the physical object (S45). Here focusing is carried out IV focus controller 1a so as to focus on the physical object 110.

Once AF has been carried out on the physical object, shooting of the physical object is carried out (S47). Here the physical object 110 is photographed at the Tele angle of view 51 of FIG. 3. In this case, shooting is carried out with the exposure control values that were determined in step S39. This is in order to ensure color reproducibility by shooting under the same exposure conditions as at the time of shooting the color chart 20a. Here the image data of the image that has been taken may be stored in the memory 4 as an image file, or may be transmitted as an image file to the movement section 20 by means of the communication section (refer to S19 in FIG. 5).

This image file is preferably associated with a color chart image, and may be stored within the same image file. In creating the image file, data (including type equipment etc.) that has been acquired by the moving body (movement section 20) is acquired by communication, and if data and information etc. that has been acquired by the moving body is stored in tags of the image data together with normal shooting data and supplemental data. In this way, the value as information is increased, and it is possible to improve search characteristics and to enable reference as supplemental information at the time of examination. This type of supplemental information is not limited to being exchanged with the movement section 20, and convenience for search and image analysis is further increased if angle and type of the color chart 20a and the camera section 10, weather information that has been acquired by the operation section 30 etc. are stored collectively. Also, if radiological information, pollen count information, atmospheric pollution information etc. is stored in combination with environmental information that has been measured at the current location with dedicated sensors, it is possible to effectively utilize image information in news reports also.

If shooting of the physical object has been carried out, it is next checked that there are no shadows or reflections (S49). Here it is determined by the image determination section 1c whether or not shadows or reflections appear on physical object 110. As well as this determination been possible with change over time of shading patterns, the pattern itself and brightness distribution and histograms of patterns, determination can also be performed by being used in combination with special optical filters and sensors.

If the result of determination in step S42 or S49 is that there is shade or reflection, movement required location is carried out (S51). In the event that there are shadows or reflections in the color chart 20a or the physical object 110, this fact is transmitted to the movement section 20 in order to move the movement section 20 to a location where there is no shade or reflection and carry out shooting again. If the movement section 20 receives this transmission, it is then moved in a permissible range, as described previously (S23 in FIG. 5). In dangerous conditions where the movement section 20 moves around aimlessly, this fact may be simply notified to the operator. At this time, it is easy to provide advice as to where it should be moved to, such that returning to a place where there was no shadow etc. can be carried out by monitoring a result at the time of movement. Angle of illumination, such as sunlight, may also be calculated and advice display carried out.

If the movement required communication has been carried out in step S51, or if the result of determination in step S49 was that there was no shadow or reflection, it is next determined whether or not there is another instruction (S53). Here it is determined whether or not there is a command such as stop to the camera section 10. If the result of this determination is that there is not another command, processing returns to step S31. On the other hand if there is an instruction, processing is carried out in accordance with that stop instruction or the like (S55).

In this way, regarding operation of the camera section 10, at a shooting position on image including the color chart 20a and an image of the physical object 110 are respectively taken (refer to S41 and S47). In shooting the color chart 20a and the physical object 110, respective focusing operations are carried out (refer to S39 and S45), but at the time of exposure control shooting of the physical object 110 is also carried out with the exposure control values for when shooting the color chart 20a. As a result it is possible to accurately carry out color correction for the physical object 110. In particular, it is easy to examine color change of the physical object 110 over time.

Also, for the images of the color chart 20a and the physical object 110, it is determined whether or not there is shadow and reflection (refer to S43 and S49), and if there is shadow and reflection communication is carried out to the movement section 20 so as to move (referred to S51). This means that it is possible to acquire images in which there is no shadow, and it is possible to accurately carry out color correction using the color chart 20a.

In this way, with the first embodiment of the present invention, the camera section 10 and a color chart 20a are mounted on the movement section 20, and it is possible to carry out shooting of the color chart 20a and the physical object 110 with a single imaging system 100. When monitoring buildings on the like, it is easy to observe change in colors over time with a simple device.

Also, in a case where the light source environments are not the same, the movement section 20 is moved in a permissible range until the light source environments become the same, and shooting is carried out again. As a result, even in cases search is where conditions are not satisfied by carrying out shooting again it is possible to acquire intended images (images of a color chart and a physical object).

Next, a second embodiment of the present invention will be described using FIG. 7A to FIG. 9. With the first embodiment, there was a single imaging system 100, and the camera section 10 and the color chart 20a were held on this imaging system 100. By contrast, with the second embodiment, a set of two movement systems is adopted, and of these two emerging systems a movement system 100A is for shooting and a movement system 100B is for holding and movement of the color chart 20a. However, the present invention is not limited and a shooting system (s) can be used instead of, or combined with, the movement system (s).

Since the cooperation relationships have become complex, detailed description is omitted, but basically, with respect to information at the time of shooting, monitoring, acquiring information and transmitting information such as was described in the first embodiment, the fact that it is better to correlate with image files and data is the same, and enriching of image tags etc. is also carried out with the same control as in the first embodiment.

Figure 7A:
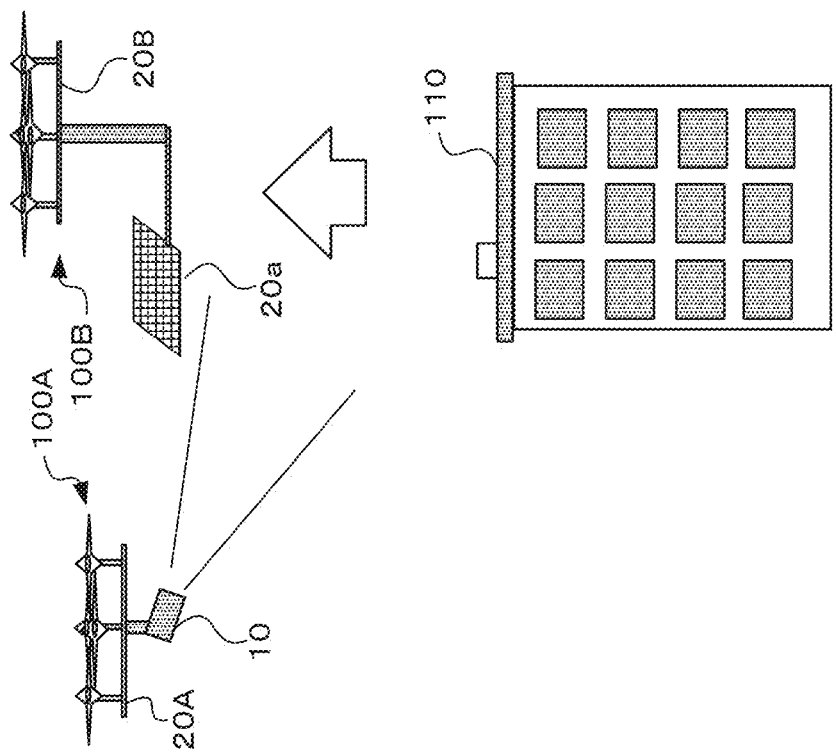
FIG. 7A and FIG. 7B are drawings for explaining imaging, in an imaging system of a second embodiment of the present invention.
Figure 7B:
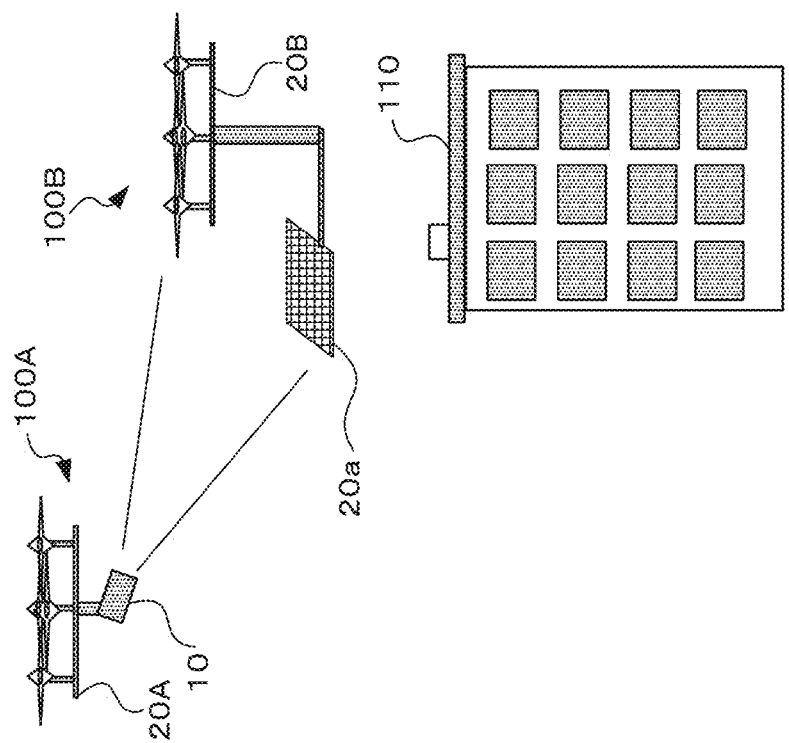

As shown in FIG. 7A and FIG. 7B, the movement system 100A has a camera section 10 mounted on the movement section 20A, but a color chart is not provided. Also, the movement system 100B has the color chart 20a provided on the movement section 20B, but a camera section 10 is not mounted.

The structures of the camera section 10, movement section 20A, movement section 20B and operation section 30 of this embodiment are the same as in the block diagram shown in FIG. 1 relating to the first embodiment, and as described above, the only difference between the movement system 100A and the movement system 100B is whether the camera section 10 is provided or the color chart 20a is provided. It is also possible to carry out communication such as for control data by wireless communication between the movement section 20A within the movement system 100A and the movement section 20B within the movement system 100B by means of the communication section 23b. The remaining structure is the same as for the first embodiment and so detailed description has been omitted.

Next, an imaging method that uses the movement system 100A and movement system 100 of this embodiment will be shown using FIG. 7A and FIG. 7B.

FIG. 7A shows the appearance of shooting the color chart 20a of the movement system 100B with the movement system 100A. Specifically, the movement system 100A having the movement section 20 and the color chart 20a is moved close to the physical object 110. Then, in this state, the movement system 100A having the camera section 10 shoots the color chart 20a. In this state, light from a light source (e.g., sunlight) is irradiated to the physical object 110 and the color chart 20a under almost the same conditions.

Once the color chart 20a has been photographed, the movement system 100B is moved upwards and taken out of the shooting range of the camera section 10, as shown in FIG. 7B. In this state the camera section 10 of the movement system 100A carries out shooting of the physical object 110. As shown in FIG. 3, with the first embodiment this shooting range differs between when shooting the color chart 20a and when shooting the physical object 110, but with this second embodiment the shooting range may be kept the same for both cases. However, this is not limiting, and the shooting ranges may be changed so that the color chart 20a and the physical object 110 become optimal. However, in order to make it possible to compare colors after shooting, either conditions for exposure control are made the same at the time of shooting the color chart 20a and at the time of shooting the physical object 110, or alternatively shooting is performed with different exposures and then corrected by referencing the color chart 20a.

Next, operation of the movement section 20B will be described using the flowchart shown in FIG. 8. Operation of the movement section 20A business same as the flow shown in FIG. 5, and so detailed description has been omitted. Also, the flow show in FIG. 8 is executed by the CPU within the controller 21 of the movement section 20B controlling each section within the movement section 20B in accordance with a program that has been stored in memory within the controller 21.

Figure 8:
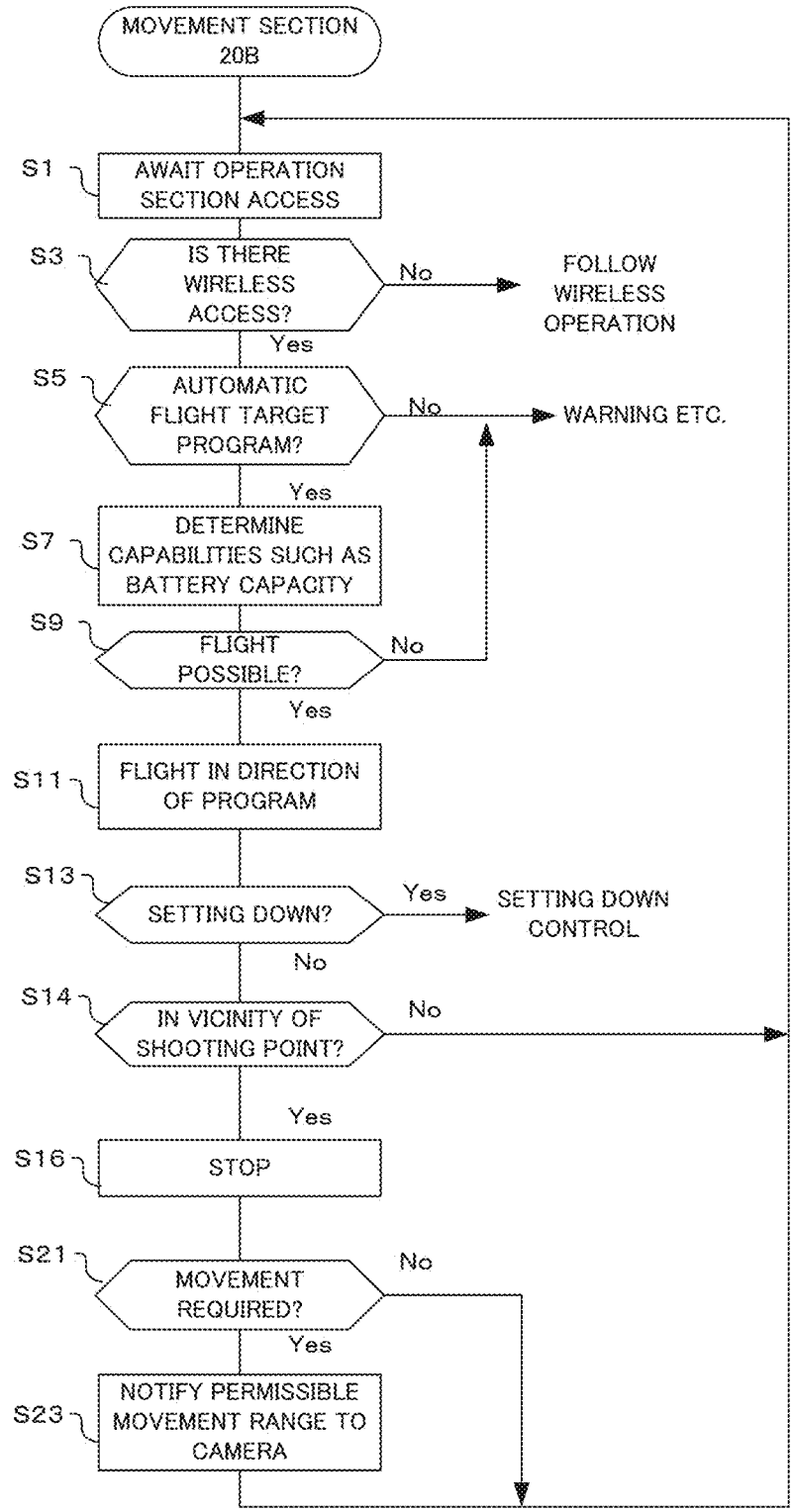
FIG. 8 is a flowchart showing operation of a movement section 20B of the imaging system of the second embodiment of the present invention.

Compared to the flow for the movement section show in FIG. 5, the flow for the movement section 20B shown in FIG. 8 has the processing of steps S15, S17 and S19 in FIG. 5 replaced with steps S14 and S16. Other than this the flows are the same, and so description will center on this different processing.

The flow for the movement section 20B shown in FIG. 8 is started, and in step S13 it is determined whether or not there is setting down. If the result of this determination is that there is no setting down, it is next determined whether or not it is in the vicinity of a shooting point (S14). With this embodiment shooting is carried out using the movement system 100A and the movement system 100B in cooperation, and control is carried out with the movement system 100A as a master system with respect to the movement system 100B. If it is determined that the movement section 20A at the movement system 100A side is in the vicinity of a shooting point, or that a shooting instruction has been issued, the fact that the movement section 20A is in the vicinity of the shooting point is transmitted to the movement section 20B at the movement system 100B side by means of the communication section 23b. In this step determination is based on transmission information from the movement section 20A. If the result of this determination is No, processing returns to step S1.

On the other hand, if the result of determination in step S14 is in the vicinity of a shooting point, movement is stopped (S16). Here, as was shown in FIG. 7A, since the movement section 20B of the movement system 100B is in the vicinity of the physical object 110, a midair standby state is entered at this position. If a standby state is entered in midair, the camera section 10 of the movement system 100A carries out shooting of the color chart 20a.

Next it is determined whether or not movement is required (S21). In the camera section 10 of the movement system 100A it is determined whether or not movement is required based on image data that has been acquired by the imaging section 2, and if movement of the movement system 100B is required this fact is transmitted by means of the communication section 23b. In this step determination is based on transmission information from the movement system 100A. It should be noted that the camera section 10 may determine what position it would be good to move the movement system 100B to based on image data that has been acquired by the imaging section 2, and instruct the position that the movement system 100B should be moved to by means of the communication section 23b. Alternatively, the image data that has been acquired by the imaging section 2 may be transmitted to the movement system 100B by the camera section 10, and the movement system 100B itself may determine the position it should be moved to. Here the position that the movement system 100B should be moved to may be determined based on the position of the camera section 10, shooting condition of the camera section 10, and the physical object 110. More specifically, the movement system 100B may also move outside of a range that falls into the angle of view of the camera section 10.

If the result of determination in step S21 is that movement is required, movement in a permissible range is notified to the camera (S23). Here, the movement section 20B is moved in range where there is no collision with or approach to the physical object 110, in accordance with instruction from the movement section 20A. Once movement is completed, the fact that movement has been completed is notified to the camera section by means of the communication section 23*a* and the communication section 3*a*.

If there has been movement in a permissible range and notification to the camera in step S23, or if the result of determination in step S21 is that movement is not required, processing returns to step S1. In this way, since there are numerous items of information in the movement section 20, if these items of information are stored in association with shooting data, etc., it will naturally be beneficial in image analysis etc. Necessary information may also be transmitted to the camera section 10 as required.

Next, operation of the camera will be described using the flowchart shown in FIG. 9. It should be noted that the flow shown in FIG. 9 is executed by the CPU within the controller 1 of the camera section 10 controlling each section within the camera section 10 in accordance with a program that has been stored in memory within the controller 1.

Figure 9:
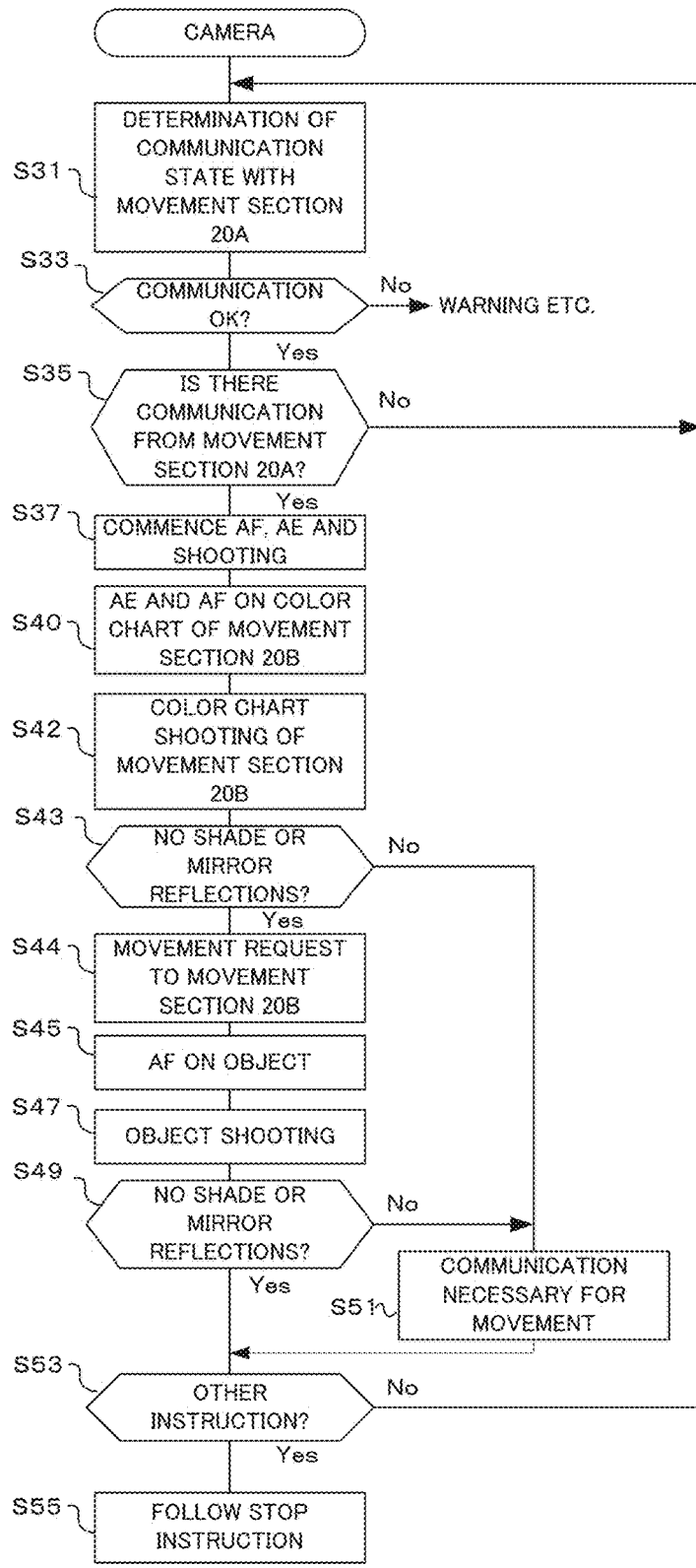
FIG. 9 is a flowchart showing operation of a camera of the imaging system of the second embodiment of the present invention.

Compared to the flow for the movement section shown in FIG. 6, the camera flow shown in FIG. 9 has the processing of steps S39 and S41 shown in FIG. 6 replaced by steps S40 and S42, and additionally has step S44, but the remaining flow is the same, and so description will center on the different processing.

If the flow for the movement section 20B shown in FIG. 9 is started, first determination of communication state with the movement section 20A is carried out (S31). Here, since the camera section 10 is mounted on the movement system 100A the communication section 3*a* of the camera section 10 carries out communication with the communication section 23*a* of the movement section 20A.

Next it is determined whether or not communication is OK (S33), and if communication is OK it is then determined whether or not there is communication from the movement section 20A (S35). If either of the movement system 100A and the movement system 100B reaches the vicinity of a shooting point, and a shooting instruction is issued from the operator, that fact is transmitted from the movement system 100A to the camera section 10. Here it is determined whether or not that communication has taken place.

If the result of determination in step S35 is that there is communication, AF, AE, and imaging are commenced (S37). Here the focus controller 1*a* carries out focusing of the optical system 2*b* (AF), the imaging control section 1*b* carries out exposure control (AE), and imaging control is carried out using the imaging section 2.

Next, AE and AF are carried out on the color chart 20*a* (S40). The color chart 20*a* is mounted on the movement system 100B, with AF control being carried out so as to focus on this color chart 20*a*, and AE control being carried out so as to achieve correct exposure.

Next, shooting of the color chart of the movement section 20A is carried out (S42). Here shooting of the color chart 20*a* that is mounted on the movement system 100B is carried out at exposure control values, such as a shutter speed value and aperture value, that have been determined by the AE control (refer to FIG. 7A). Parameters of this type of shooting are stored in the file of a taken image, so that they can be analyzed later. For results of shooting a plurality of times also, schemes are implemented to tie images together, such as attaching information so that respective mutual relationships can be understood, and creating administration files. Also, together with this, each of information items that have been detected by the movement section 20 and the operation section 30 are correlated to image data. In the second embodiment, since there are a plurality of movement sections 20A, 20B, it is preferable to take steps to also understand positional relationships between each of the movement sections (movement units) and the cameras using GPS etc., so that the movement sections do not become confused.

Once shooting of the color chart 20*a* has been carried out, it is next checked that there are no shadows and reflections (S43). Here it is determined by the image determination section 1*c* whether or not shadows or reflections appear on the image that has been taken of the color chart 20*a*.

If the result of determination in step S43 is that there are no shadows or reflections, next a movement request is issued to the movement section 20B (S44). Once the color chart 20*a* has been photographed, next shooting of the physical object 110 is carried out. For the purposes of this shooting, the movement system 100B (movement section 20B) is moved so as not to hinder shooting of the physical object 110, as shown in FIG. 7B. Here communication to effect movement is carried out with the movement section 20B of the movement system 100B, by means of the movement system 100A.

Once the movement request has been carried out, next AF is carried out on the physical object (S45), and the physical object is photographed (S47). The movement system 100B has moved in step S44, so that it is possible for the camera section 10 to carry out shooting by focusing on the physical object 110 without interfering with the color chart 20*a*. It should be noted that at the time of this shooting, shooting is carried out with the exposure control values that were determined in step S39.

If shooting of the physical object has been carried out, it is next checked that there are no shadows or reflections (S49). Here it is determined by the image determination section 1*c* whether or not shadows or reflections appear on physical object 110.

If the result of determination in step S43 or S49 is that there is shade or reflection, movement required communication is carried out (S51). In the event that there are shadows or reflections in the color chart 20*a* or the physical object 110, this fact is transmitted to the movement section 20A and the movement section 20B in order to move the movement section (s) 20 to a location where there is no shade or reflection and carry out shooting again. If the movement section 20A and movement section 20B receive this transmission, they are then moved in a permissible range, as described previously (S23 in FIG. 5, S23 in FIG. 8).

If the movement required communication has been carried out in step S51, or if the result of determination in step S49 was that there was no shadow or reflection, it is next determined whether or not there is another instruction (S53), and if the result of this determination is that there is not another instruction processing returns to step S31. On the other hand if there is an instruction, processing is carried out in accordance with that stop instruction or the like (S55).

In this way, in the second embodiment of the present invention, since two imaging systems are provided, when shooting the color chart 20*a* and the physical object 110 the degree of freedom is increased, and it is possible to carry out shooting of the color chart 20*a* and the physical object 110 at optimum positions.

Next, a first modified example of the second embodiment of the present invention will be described using FIG. 10A, FIG. 10B and FIG. 11. In the second embodiment, shooting of the color chart 20*a* and the physical object 110 was carried out using two imaging systems, namely the movement system 100A and the movement system 100B. However, in this case, if the distance between the movement system 100A and the movement system 100B becomes great, the color chart 20a is too small and color evaluation becomes difficult. This point will be described using FIG. 10A and FIG. 10B.

FIG. 10A shows a case where a distance from the movement section 20A on which the camera section 10 to the physical object 110 and the movement section 20B having the color chart 20a is appropriate. In this case, in a case where the color chart 20a has been photographed it is possible to make the color chart 20a sufficiently large and color correction can be carried out. It should be noted that in this modified example the color chart 20a is mounted on the upper side of the movement section 20A.

FIG. 10B shows a case where a distance L from the movement section 20A to the physical object 110 and the movement section 20B is quite far. In this case the color chart 20a is too small, it is not possible to evaluate color properly, and color correction cannot be carried out properly. With this modified example, therefore, the distance between the two movement sections 20A and 20B is maintained so as to be appropriate. Here an appropriate distance L can be changed in accordance with size of the color chart 20a, shooting performance of the camera section 10, or accuracy required for examination using the color chart 20a. Accordingly, the controller 1 may also calculate an appropriate distance from the movement section 20A to the physical object 110 and the movement section 20B.

FIG. 11 shows an imaging method of this modified example. First, as shown in the state for time T1 in FIG. 11, the camera section 10 carries out shooting of both the physical object 110 and the color chart 20a by having the two contained within the region 120.

Next, as shown in the state for time T2 in FIG. 11, the movement system 100B moves out from within the region 120 and in that state the camera section 10 shoots only the physical object 110 within the region 120. When carrying out shooting of the physical object 110, exposure conditions are made the same as when shooting the color chart 20a. As a result color correction is made simple.

Once shooting of the physical object 110 has been carried out, next, as shown in the state for time T3 in FIG. 11, the movement system 100A moves in a horizontal direction and the camera section 10 then carries out shooting of both the physical object 110 and the color chart 20a by having the two contained within a new region 121.

It should be noted that the physical object 110 in this case is assumed to be an architectural structure, etc., like a long continuous wall or a bridge, that is continuous within the regions 120 and 121, and the camera section 10 of the movement system 100A is for sequential shooting of images of this architectural structure, etc.

Next, a second modified example of the second embodiment of the present invention will be described using FIG. 12. With the first modified example, shooting was performed using two imaging systems, but with this modified example three imaging systems are used so as to acquire images swiftly.

Specifically, in the first modified example, after shooting the color chart 20a the position of the movement system 100B is moved and then the physical object 110 is photographed. As a result, it takes time to shoot the color chart 20a and the physical object 110. With the second modified example, therefore, two imaging systems that have the camera section 10 are used, and images are acquired swiftly.

With this modified example, the movement system 100A and the imaging system 100C are respectively provided with camera sections 10A and 10C, with the camera section 10C shooting the physical object 110 and the camera section 10A shooting the color chart 20a. Also, the movement system 100B, similarly to the first modified example, is not fitted with a camera section 10 and instead is provided with the color chart 20a.

The shooting of this modified example involves first, as shown in the state for time T11 in FIG. 12, shooting the physical object 110 within region 1 using the camera section 10C. Also, simultaneously, shooting of the color chart 20a is carried out using the camera section 10A. When carrying out shooting of both the color chart and the physical object, exposure control conditions for the camera section 10A and the camera section 10C are made the same. As a result color correction is made simple.

If shooting of the physical object 110 that is in region 1, and the color chart 20a, has been carried out, next the imaging systems 100A, 100B and 100C are moved in parallel, as shown in the state for time T12 in FIG. 12, and the camera section 10C of the imaging system 100C is stopped at a position where it is possible to shoot the physical object 110 that is in region 121. In this state the camera section 10C shoots the physical object 110, and the camera section 10A shoots the color chart 20a. In this case also, exposure control conditions for the camera section 10A and the camera section 10C are made the same. After that, this operation is repeated.

It should be noted that in this modified example also, it is preferable that the movement system 100B does not enter into the field of view of the movement system 100A. Also, the movement system 100A and the movement system 100B preferably have the same movement trajectory. In this way it is possible to shoot the same physical object 110, which makes color correction simple.

In this way, with the second modified example, although three imaging systems are used it is possible to shoot the physical object 110 and the color chart 20a simultaneously, which means it is possible to carry out shooting rapidly.

As has been described above, with each of the embodiments and each of the modified examples of the present invention, a first imaging step of shooting a color chart 20a under a first shooting condition and acquiring first image data (refer, for example, to S41 in FIG. 6), a second imaging step of shooting a physical object under a second shooting condition and acquiring second image data (refer, for example, to S47 in FIG. 6), and a determination step of determining illuminated state of the physical object and the color chart based on the first and second image data (refer, for example, to S43 and S49 in FIG. 6), are carried out. This enables imaging that can monitor change over time of a monitored physical object, regardless of changes in a light source etc. or the environment of the monitored physical object.

Also, with each of the embodiments and each of the modified examples of the present invention, in the determination step, if it is determined that illuminated states are different, or if it is determined that the illuminated state is shade or strong reflection, then shooting position of the imaging section is moved and shooting is carried out again (refer, for example, to S51 in FIG. 6). This makes it possible to carry out shooting so that it appears that there is no change in the light source environment, even if illuminated state is different for the physical object and the color chart.

Also, with each of the embodiments and each of the modified examples of the present invention, the first shooting condition and the second shooting condition (such as exposure) are the same (refer, for example, to S41 and S47 in FIG. 6). As a result, it becomes possible for color cast of the color chart and the physical object to always be determined under the same conditions, even if special image processing is not applied. By making an image file that is suitable for shooting in an environment where devices are working cooperatively, it is possible to increase amount of reference information for search, observation, examination and verification.

Also, with each of the embodiments and each of the modified examples of the present invention, a movement step of moving by remote operation so that position of the color chart is changed (refer, for example, to S23 in FIG. 5), a first imaging step of determining position of the color chart and forming an image of the color chart (refer, for example, to S41 in FIG. 6), and a second imaging step of forming an image of the physical object (refer, for example, to S47 in FIG. 6), are carried out. As a result, even in a case where position of the color chart is unsuitable, it is possible to move to an appropriate position and form an image.

Also, with each of the embodiments and each of the modified examples of the present invention, a storage control section is provided for storing acquired information of a moving body, that has been acquired by communication with the moving body, in association with an acquired image. Specifically, in association with image data that has been acquired by the camera section 10, time of imaging and supplemental information at the time of imaging (for example, time and date information, audio data, temperature data, flight history, position information etc.) is made into a file and stored. As a result the admissibility of the image data is increased, and it is possible to improve analysis of image data.

It should be noted that with each of the embodiments and each of the modified examples of the present invention, examples using the present invention in a remotely operated aircraft have been described. However, besides an aircraft for carrying out examination where sunlight is used, the present invention may also be utilized in a remotely controlled device or self-contained moving unit such as a remotely operated vehicle, remotely operated ship, submarine, submersible or rocket. The present invention may also be applied to use of an imaging section outputting a warning in the event that the color chart and the physical object are in separate illuminated states, such as a wearable imaging and examination unit etc.

Also, in the case of a camera for examining a physical object, depending on that physical object there is a possibility that various arrangements will be necessary, and so here, while description has been given for a camera that is separate to the movement section 20, it is also possible to have the movement section and the camera integrated. Also, while the description has been given for cases where the light source is sunlight, it does not have to be sunlight. As long as it is possible to determine and handle) a difference between illuminated states of the physical object and the color chart, it is applicable under any conditions such as artificial light or moonlight.

Also, with each of the embodiments and each of the modified examples of the present invention, the color chart has color samples arranged in cells, but this is not limiting as long as it is possible to carry out examination of colors. Shooting of the color chart and the physical object is carried out under the same exposure conditions, but may be with different exposure conditions under certain situations. In this case, differences in exposure conditions are stored, and when reproducing image data image processing is applied in accordance with the differences in exposure conditions. In applying image processing in accordance with differences in exposure conditions, it is advisable to store image data of the color chart and the physical object as RAW data. Also, while a color chart has been used as an examination chart, this is not limiting, and a shooting test chart such as a grey chart, a color table, color samples, and examination chart for not only color but surface texture, blemishes and flaws may also be used.

With each of the embodiments and each of the modified examples of the present invention, each of the sections within the controller 1, controller 21 and controller 31 are implemented in software using a CPU and a program stored in memory, but this is not limiting, and a hardware structure such as gate circuits generated based on a program language described using Verilog may be used, as well as a hardware structure that uses software such as a DSP (Digital Signal Processor). Suitable combinations of these approaches may also be used.

Further, with this embodiment, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. The present invention can also be applied to a device for shooting not under remote control but under specified conditions with a specified program, or a device for shooting at regularly intervals or at a stated time. As long as these conditions are met, the present invention can be applied to technology for selecting preferred items from shooting results. The physical object may be a structure, a mountain, land surface, the bottom of the ocean, or a crater, or fauna and flora such as forests and coral. In any event, it is possible to apply the present invention to a device that also shoots an examination reference chart together with shooting a physical object.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably

What is claimed is:

1. An imaging apparatus, comprising:
an imaging section that acquires image data;
a movement section having a thrust mechanism capable of movement and moving the imaging apparatus so that the imaging section can acquire image date of a physical object;
an imaging control section that acquires first image data, using the imaging section, of an examination chart under a first shooting condition, and that acquires second image data, using the imaging section, of the physical object under a second shooting condition; and
a determination section that determines an illuminated state for at least one of the physical object and the examination chart based on the first and second image data,
wherein when it has been determined by the determination section that the illuminated states of the physical object and the examination chart are different, the imaging control section carries out shooting of at least one of the examination chart and the physical object again.

2. The imaging apparatus of claim 1, further comprising:
a storage control section that generates and stores image files that associate the first image data and the second image data.

3. The imaging apparatus of claim 1, further comprising:
a communication section that transmits determination results of the determination section to an operation section that operates the movement section.

4. The imaging apparatus of claim 1, wherein:
when it has been determined by the determination section that the illuminated states of the physical object and the examination chart are different, the movement section moves within a permissible range where there is no collision with the physical object.

5. The imaging apparatus of claim 1, wherein:
the first shooting condition and the second shooting condition are the same.

6. An imaging apparatus comprising:
an imaging section that acquires image data;
a movement section having a thrust mechanism capable of movement and moving the imaging apparatus so that the imaging section can acquire image date of a physical object;
an imaging control section that acquires first image data, using the imaging section, of an examination chart under a first shooting condition, and that acquires second image data, using the imaging section, of the physical object under a second shooting condition;
a determination section that determines an illuminated state for at least one of the physical object and the examination chart based on the first and second image data; and
a communication section that carries out communication with a device having the examination chart; and wherein
when the imaging section acquires the second image data, in the event that it has been determined that it is necessary to move the device having the examination chart, the communication section transmits a signal indicating that movement is necessary to the device having the examination chart.

7. The imaging apparatus of claim 6, wherein:
after the imaging section has acquired the first image data, the communication section transmits a signal indicating that acquisition of the first image data has been completed to the unit having the examination chart.

8. The imaging apparatus of claim 1, wherein:
the imaging section, after having acquired the first image data, acquires the second image data after the examination chart has been moved out of an angle of view of the imaging section.

9. An imaging method using a mobile examination chart and a mobile camera, the method comprising:
forming, using the mobile camera, an image of the mobile examination chart under a first shooting condition to generate first image data;
forming, using the mobile camera, an image of a physical object under a second shooting condition to generate second image data; and
determining illumination conditions for the physical object and the mobile examination chart based on the first image data and second image data, respectively,
wherein responsive to a determination that the illumination conditions of the physical object and the mobile examination chart are different, shooting at least one of the examination chart and the physical object again.

10. The imaging method of claim 9, wherein:
responsive to a determination that the illumination conditions of the physical object and the mobile examination chart are different, (1) moving a shooting position of the mobile camera, (2) forming a new image of the mobile examination chart under the first shooting condition to generate new first image data, and (3) forming a new image of the physical object under the second shooting condition to generate a new second image data.

11. The imaging method of claim 9, wherein:
the first shooting condition and the second shooting condition are the same.

12. A system comprising:
an imager;
an examination chart including a surface having at least one predefined chromatic or achromatic color;
at least one movement section for moving the imager and the examination chart, either together or independently, to a position at which a physical object is observable; and
a control system for (1) instructing the imager to capture an image of the examination chart to generate first image data, and (2) instructing the imager to capture an image of the physical object to generate second image data; and
a determination section that determines an illuminated state for at least one of the physical object and the examination chart based on the first and second image data,
wherein when it has been determined by the determination section that the illuminated states of the physical object and the examination chart are different, the control system instructs the imager to carry out shooting of at least one of the examination chart and the physical object again.

13. The system of claim 12 wherein the control system further (3) determines whether or not an illumination condition is acceptable based on an analysis of the first and second image data, and responsive to a determination that the illumination condition is not acceptable, the control system (4) instructs the at least one movement section to move the imager, (5) instructs the imager to capture a new image of the examination chart to generate third image data, (6) instructs the imager to capture a new image of the physical object to generate fourth image data, and (7) determines whether or not a new illumination condition is acceptable based on an analysis of the third and fourth image data.

14. The system of claim 12 wherein the act of instructing the imager to capture an image of the examination chart to generate first image data is performed at a first angle of view, the act of instructing the imager to capture an image of the physical object to generate second image data is performed a second angle of view, and the first angle of view is wider than the second angle of view.

15. The system of claim 12 wherein the at least one movement section includes a single movement section physically coupled with both the imager and the examination chart.

16. The system of claim 12 wherein the illumination condition is not acceptable if at least one of the examination chart and the physical object is under more than a predetermined amount of shadow.

17. The system of claim 12 wherein the illumination condition is not acceptable if at least one of the examination chart and the physical object is under more than a predetermined amount of glare.

18. The system of claim 12 wherein the at least one movement section includes a first movement section physically coupled with the imager and a second movement section physically coupled with the examination chart, and the first and second movement sections can move independently of each other.

19. The system of claim 18 wherein the act of instructing the imager to capture an image of the examination chart to generate first image data is performed with the first and second movement sections having a first positional relationship, and the act of instructing the imager to capture an image of the physical object to generate second image data is performed with the first and second movement sections having a second positional relationship that is different from the first positional relationship.

20. The system of claim 19 wherein in the second positional relationship, the examination chart is outside a field of view of the imager.

21. An imaging method using a mobile examination chart and a mobile camera, the method comprising:
forming, using the mobile camera, an image of the mobile examination chart under a first shooting condition to generate first image data;
forming, using the mobile camera, an image of a physical object under a second shooting condition to generate second image data;
determining illumination conditions for the physical object and the mobile examination chart based on the first image data and second image data, respectively; and
communicating with a device having the examination chart, wherein
when the mobile camera forms the second image data, in the event that it has been determined to move the device having the mobile examination chart, transmitting a signal instructing movement to the device having the mobile examination chart.

22. A system comprising:
an imager;
an examination chart including a surface having at least one predefined chromatic or achromatic color;
at least one movement section for moving the imager and the examination chart, either together or independently, to a position at which a physical object is observable;
a control system for (1) instructing the imager to capture an image of the examination chart to generate first image data, and (2) instructing the imager to capture an image of the physical object to generate second image data; and
a communication section that carries out communication with a device having the examination chart; and wherein
when the mobile camera forms the second image data, in the event that it has been determined to move the device having the mobile examination chart, transmitting a signal instructing movement to the device having the mobile examination chart.

* * * * *